United States Patent
Joseph et al.

(10) Patent No.: US 11,645,193 B2
(45) Date of Patent: May 9, 2023

(54) HETEROGENEOUS SERVICES FOR ENABLING COLLABORATIVE LOGIC DESIGN AND DEBUG IN ASPECT ORIENTED HARDWARE DESIGNING

(71) Applicant: International Business Machines Corporation, Armonk, NY (US)

(72) Inventors: Arun Joseph, Kadugodi (IN); Wolfgang Roesner, Austin, TX (US); Anthony Saporito, Highland, NY (US); Matthias Klein, Poughkeepsie, NY (US); Sampath Goud Baddam, CV Ramannager (IN); Shashidhar Reddy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 149 days.

(21) Appl. No.: 16/922,223

(22) Filed: Jul. 7, 2020

(65) Prior Publication Data
US 2022/0012159 A1  Jan. 13, 2022

(51) Int. Cl.
*G06F 11/36* (2006.01)
*G06F 30/20* (2020.01)
*G06F 9/30* (2018.01)

(52) U.S. Cl.
CPC ........ *G06F 11/3636* (2013.01); *G06F 9/3017* (2013.01); *G06F 11/3624* (2013.01); *G06F 30/20* (2020.01)

(58) Field of Classification Search
CPC .................................................. G06F 11/362
See application file for complete search history.

(56) References Cited

U.S. PATENT DOCUMENTS

| | | | | |
|---|---|---|---|---|
| 6,826,717 B1* | 11/2004 | Draper | ............. | G01R 31/31705 714/39 |
| 7,216,336 B1* | 5/2007 | Ezra | .................... | G06F 11/3624 717/124 |
| 9,798,352 B1* | 10/2017 | Majumdar | ................ | G06F 1/10 |
| 10,235,485 B1* | 3/2019 | Iyer | ......................... | G06F 30/34 |
| 2007/0011620 A1* | 1/2007 | Mendel | ..................... | G06F 8/31 715/764 |
| 2007/0168994 A1* | 7/2007 | Barsness | ............... | G06F 11/362 717/129 |
| 2010/0057865 A1* | 3/2010 | Chan | ................... | G06F 11/3664 709/227 |
| 2011/0016444 A1 | 1/2011 | Paris | | |

(Continued)

*Primary Examiner* — Jae U Jeon
(74) *Attorney, Agent, or Firm* — Cantor Colburn LLP; Tihon Poltavets

(57) ABSTRACT

A method for collaborative logic designing and debugging of a circuit includes initiating, via a session manager, a hardware debug session that includes a plurality of instances of client applications that can access one or more source-codes associated with a logic design of the circuit, the plurality of instances of client applications configured to replicate an execution state of the logic design. The method also includes analyzing, using an instance of a first client application from the plurality of instances of client applications, a defect in the logic design based on the execution state of the logic design. The method also includes editing, using an instance of a second client application from the plurality of instances of client applications, the one or more source-codes, to repair the defect in the logic design.

19 Claims, 13 Drawing Sheets

(56) References Cited

U.S. PATENT DOCUMENTS

| | | |
|---|---|---|
| 2012/0151446 A1* | 6/2012 | Sathya ................ G06F 11/3656 717/125 |
| 2015/0213407 A1 | 7/2015 | Cabler |
| 2017/0286581 A1 | 10/2017 | Ganzhorn |
| 2018/0129584 A1* | 5/2018 | Somasundaram ..... G06N 20/00 |
| 2019/0102280 A1* | 4/2019 | Caldato ................ G06F 9/5072 |
| 2020/0042664 A1 | 2/2020 | Lee |

* cited by examiner

| Session Name | Owner Status | Session-Status | Modified Date | Actions |
|---|---|---|---|---|
| Session 1 | Created by user1 | Running | June 4, 2020 | Play/Pause Restart Delete Delegate |
| Session 2 | Created by user1 Delegated to user2 | Running Delegated | May 3, 2019 | |
| Session X | Created by userX | Empty | May 9, 2020 | |

602 / 604 / 606 / 608 / 610

612 — Create New Session

HETEROGENEOUS SERVICES FOR ENABLING COLLABORATIVE LOGIC DESIGN AND DEBUG IN ASPECT ORIENTED HARDWARE DESIGNING

BACKGROUND

The present invention relates to computing technology, and particularly to integrated development environments of computer products, including hardware products, software products, and a combination thereof, and more specifically, to facilitating collaborative logic design and debug in aspect-oriented hardware development.

Various feature-rich tools are available for software development to write, compile, debug, execute, and test computer programs. Some tools also facilitate collaboration between multiple software developers, for example, providing version control, code control, and other such features.

SUMMARY

A method for collaborative logic designing and debugging of a circuit includes initiating, via a session manager, a hardware debug session that includes a plurality of instances of client applications that can access one or more source-codes associated with a logic design of the circuit, the plurality of instances of client applications configured to replicate an execution state of the logic design. The method also includes analyzing, using an instance of a first client application from the plurality of instances of client applications, a defect in the logic design based on the execution state of the logic design. The method also includes editing, using an instance of a second client application from the plurality of instances of client applications, the one or more source-codes, to repair the defect in the logic design.

According to one or more embodiments of the present invention, a system includes a memory device, and one or more processors coupled with the memory device, the one or more processors being configured to perform a method for collaborative logic designing and debugging of a circuit. The method for collaborative logic designing and debugging of a circuit includes initiating, via a session manager, a hardware debug session that includes a plurality of instances of client applications that can access one or more source-codes associated with a logic design of the circuit, the plurality of instances of client applications configured to replicate an execution state of the logic design. The method also includes analyzing, using an instance of a first client application from the plurality of instances of client applications, a defect in the logic design based on the execution state of the logic design. The method also includes editing, using an instance of a second client application from the plurality of instances of client applications, the one or more source-codes, to repair the defect in the logic design.

According to one or more embodiments of the present invention, a computer program product includes a memory storage device having computer executable instructions stored thereon. The computer executable instructions when executed by one or more processing units cause the one or more processing units to perform a method for collaborative logic designing and debugging of a circuit. The method for collaborative logic designing and debugging of a circuit includes initiating, via a session manager, a hardware debug session that includes a plurality of instances of client applications that can access one or more source-codes associated with a logic design of the circuit, the plurality of instances of client applications configured to replicate an execution state of the logic design. The method also includes analyzing, using an instance of a first client application from the plurality of instances of client applications, a defect in the logic design based on the execution state of the logic design. The method also includes editing, using an instance of a second client application from the plurality of instances of client applications, the one or more source-codes, to repair the defect in the logic design.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 6 depicts a block diagram of a session manager according to one or more embodiments of the present invention;

Figure 1:
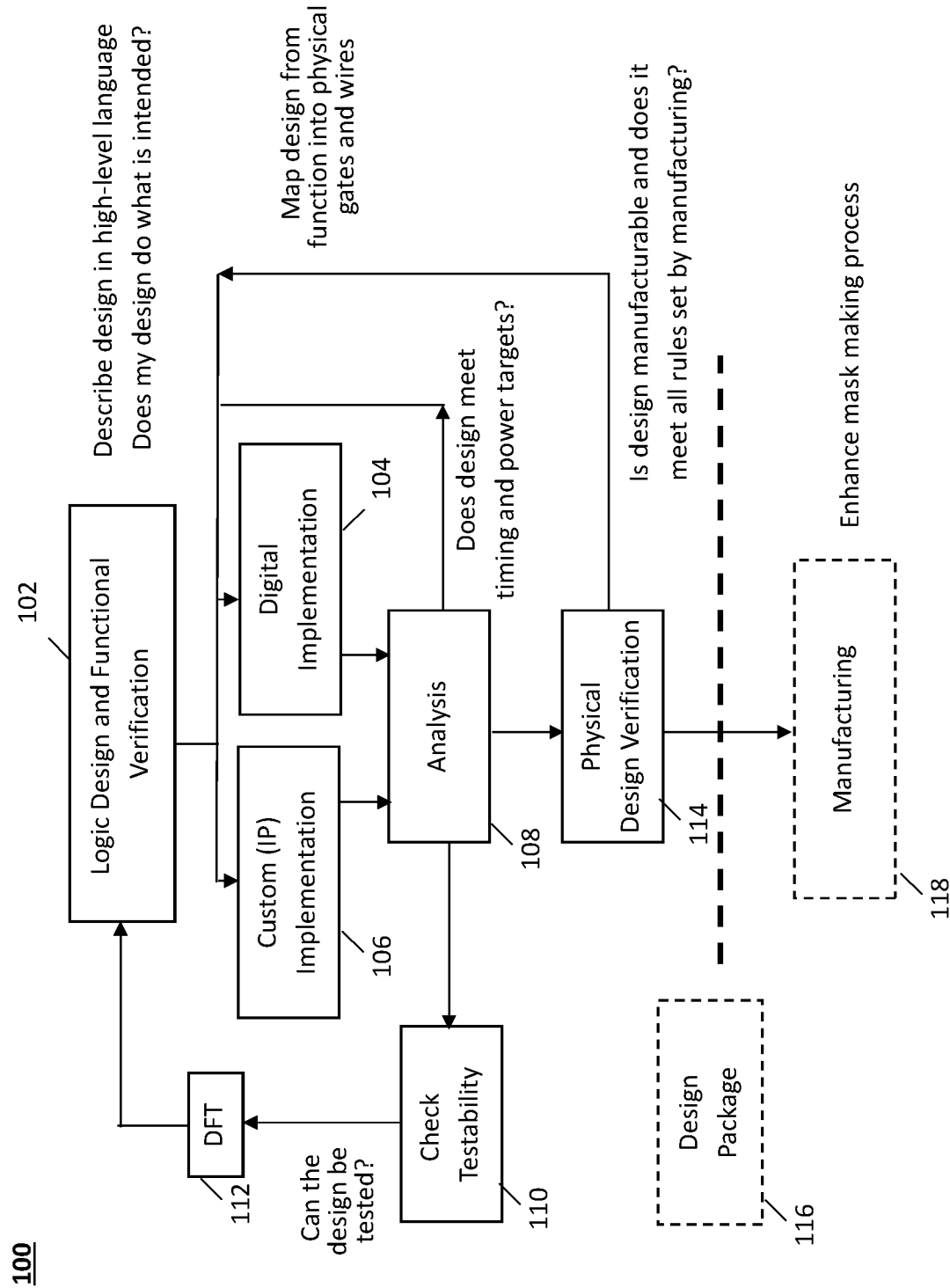
FIG. 1 depicts a typical workflow for circuit design.

The diagrams depicted herein are illustrative. There can be many variations to the diagrams, or the operations described therein without departing from the spirit of the invention. For instance, the actions can be performed in a differing order, or actions can be added, deleted, or modified. Also, the term "coupled," and variations thereof describe having a communications path between two elements and do not imply a direct connection between the elements with no intervening elements/connections between them. All these variations are considered a part of the specification.

DETAILED DESCRIPTION

Exemplary embodiments of the present invention relate to, among other things, devices, systems, methods, computer-readable media, techniques, and methodologies for improving hardware product development by enabling collaborative logic design and debug in aspect-oriented hardware designs. In one or more embodiments of the present invention, heterogeneous services are used to provide such features. In one or more embodiments of the present invention, a client-server platform is implemented to provide a heterogeneous system of logic design microservices, which enable hardware logic design and debug session containment, persistence, and state retention. Further, embodiments of the present invention also facilitate translating graphical design automation tools into scalable logic design microservices. The microservices in one or more embodiments of the present invention interoperate with other logic design microservices in the heterogeneous system for application coupling within a logic debug context. Embodiments of the present invention can provide a cloud native microservices based collaborative hardware design automation platform. One or more embodiments of the present invention facilitate bringing in a heterogeneous set of data sources from an aspect-oriented hardware design flow context, translating that to microservices in the system, and enabling interoperation across the services for cross aspect logic debug in aspect-oriented hardware designs. Here, a heterogeneous set of data sources can include data sources that provide varying type of data, such as computer programs, annotations, clock signals, etc.

Services in a microservice architecture (MSA) are often processes that communicate over a network to fulfill a goal using technology-agnostic protocols such as HTTP. Microservices can be independently deployable, and can be implemented using different programming languages, databases, hardware, and software environment. In one or more embodiments of the present invention, the microservices are messaging-enabled, bounded by contexts, independently deployable, and decentralized processes that can interact with other services.

Existing hardware design products provide monolithic systems. The development of hardware and logic design lacks feature-rich tools such as those available for software development. They lack collaborative development features, which have become critical, with development teams being spread across geographic locations and time zones. The technical effects of one or more embodiments of the present invention are to improve computing technology, particularly hardware and logic design development environments, which in turn facilitate hardware designers, logic designers, and other users to create improved hardware products, such as electronic circuits like processors, memory devices, and any other circuit. Embodiments of the present invention accordingly provide a practical application of improving hardware logic design and functional verification.

FIG. 1 depicts a typical workflow 100 for circuit design. The workflow 100 is a high-level overview, and it should be noted that in one or more embodiments, the workflow 100 can include fewer or additional operations. The workflow 100 starts with a logic design and functional verification, at block 102. Logic design, also referred to as logic synthesis is a process by which a specification of desired circuit behavior is turned into a design implementation in terms of logic gates. The specification can also be updated in this logic design phase. The logic design can result in a design of the circuit in at register transfer level (RTL). Common examples of such output include designs specified in hardware description languages, including VHDL, Verilog, etc. Functional verification is the task of verifying that the logic design conforms to the specification. Functional verification is known to be a technical challenge because of the sheer volume of possible test-cases that exist in even a simple design. Various techniques are used to address the functional verification, including, logic simulation (simulates the logic), emulation (software system to replicate the logic), formal verification (mathematical proof), intelligent verification (automation to adapt to changes in the RTL), heuristics, etc. Embodiments of the present invention facilitate using any one or more of these techniques.

Once the logic design is generated and verified, a custom implementation, at block 106, and digital implementation, at block 104, can be performed. Custom implementation includes creating a prototype of the circuit, whereas a digital implementation includes creating a digital emulator/simulator of the circuit. The custom implementation includes producing a circuit using gates, wires, and other hardware components.

Either the custom implementation, or the digital implementation, or both are analyzed, at block 108. The analysis determines whether the design meets timing and power targets that were set in the specification of the circuit. Further, the testability of the implementations is checked at block 110. Depending on the testability, design for testing (DFT) is performed, at block 112, to add testability features to a hardware product design. The added features make it easier to develop and apply manufacturing tests to the designed hardware. The purpose of manufacturing tests includes validating that the product hardware contains no manufacturing defects that could adversely affect the product's correct functioning.

Further, the workflow includes checking if the design of the circuit is manufacturable and if it meets all rules set by manufacturing, at block 114. Once the design is deemed manufacturable, a package is designed for the circuit, at block 116. The designed package is then used for manufacturing the circuit, at block 118.

Typically, the logic design and functional verification (block 102) is the most resource-consuming phase of the hardware design workflow, where resources include time, money, people, etc. Embodiments of the present invention facilitate reducing the resource consumption of this phase and facilitating a faster product development cycle in turn.

Figure 2:
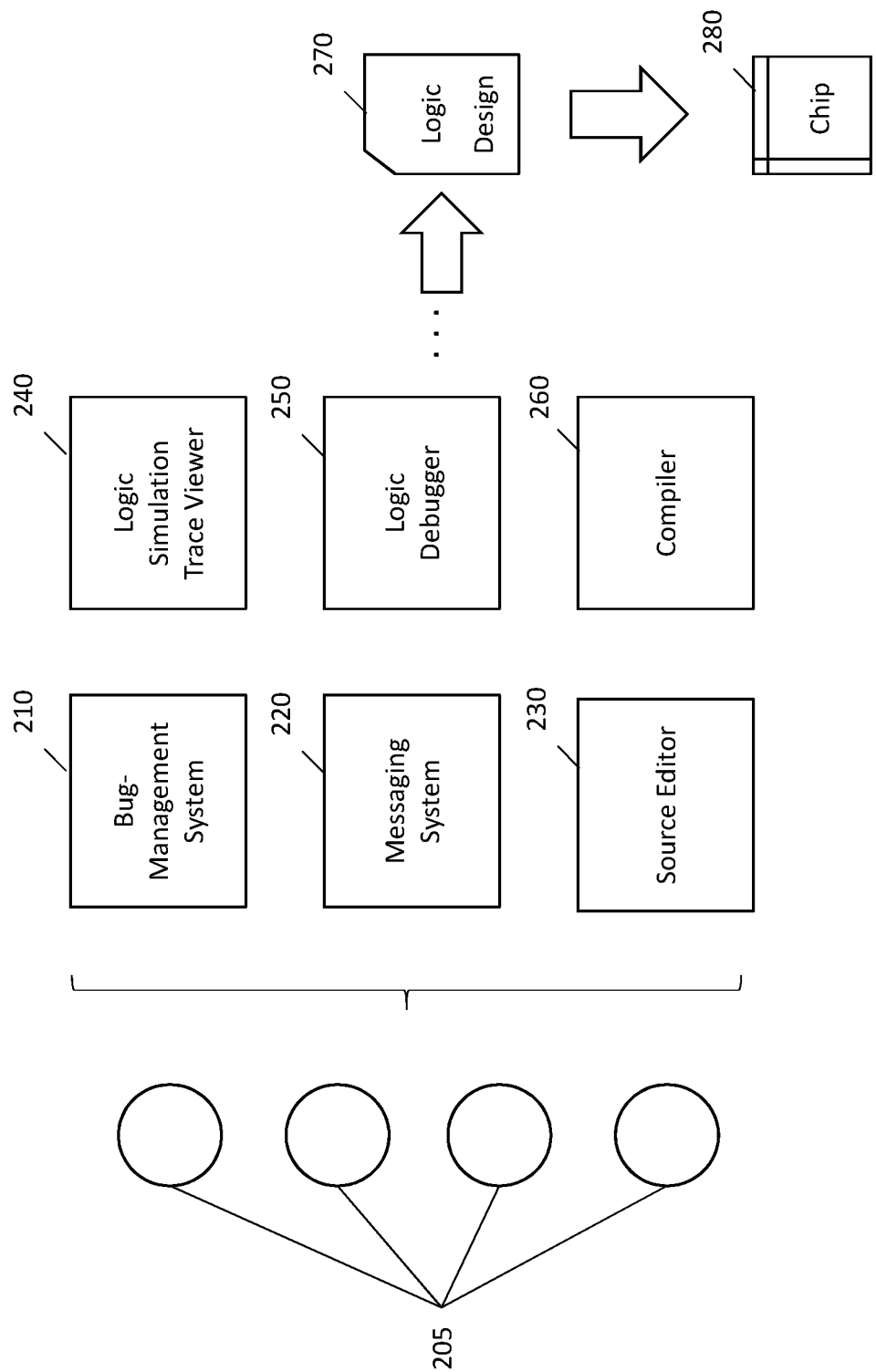
FIG. 2 depicts a set of disjoint tools used by logic designers.

At present, for logic design and functional verification, the logic designers use a varied and disjoint set of tools. FIG. 2 depicts a set of disjoint tools used by logic designers. Several logic designers 205 are depicted, all working towards creating a logic design 270, which gets manufactured into one or more circuit chips 280. The logic designers 205 can use tools, which are all computer program products, such as a source editor 230, a compiler 260, a messaging system 220, a logic debugger 250, a bug-management system 210, a logic simulation trace viewer 240, and other such tools. For example, logic designers 205 can use editors 230 such as Emacs, VI, Notepad++, or any other source editor to type their computer programs, for example, using programming languages like VHDL, Verilog, RTL, etc. The logic designers 205 can compile these programs using one or more compilers 260 for the programming language used. Further, the logic designers 205 can debug the programs using the logic debugger 250, and record information about an identified defect ("bug") in the bug-management system 210. In one or more embodiments of the present invention, logic designers 205 can share with each other information about the identified defect(s) using messaging system 220, such as email, instant messaging, etc. In one or more embodiments of the present invention, a first logic designer 205, upon receiving such notification from a second logic designer 205 (or any other testing personnel), can use a logic simulation trace viewer 240 to trace the execution of the logic design 270 to reproduce the defect at his/her end in order to repair/debug the logic design 270.

Because all these tools are disjointed, state retention of the overall system is not available in the existing scenario. Here, a "state" represents hardware debug state that identifies one or more parameters and other configuration of the logic design 270 of the hardware at which a defect has been identified. Because of the lack of such state retention, the first logic designer 205 in the above example, who receives the defect notification, has to set up the hardware state of the logic design 270 to reproduce the defect. Recreating a particular set up for the defect to be reproduced may not be possible in typical cases, because of the large number of factors involved. Further, because of the several disjoint tools involved, which can be different for different logic designers 205, the reproducibility of the defect can be more challenging.

Additionally, in the case where the logic designers 205 are geographically distributed, conveying hardware debug state to another logic designer 205 can be challenging given the large number of factors involved.

Embodiments of the present invention address such challenges by using microservices that facilitate using the tools used for logic design and verification to be executed as microservices within "sessions" that, in turn, facilitate state retention. Such retained states of the session can be shared with logic designers 205 (or other personnel) to allow reproducibility of a specific state of the hardware represented by the logic design 270. In turn, a logic designer 205 can debug or perform other operations from a provided state.

Figure 3:
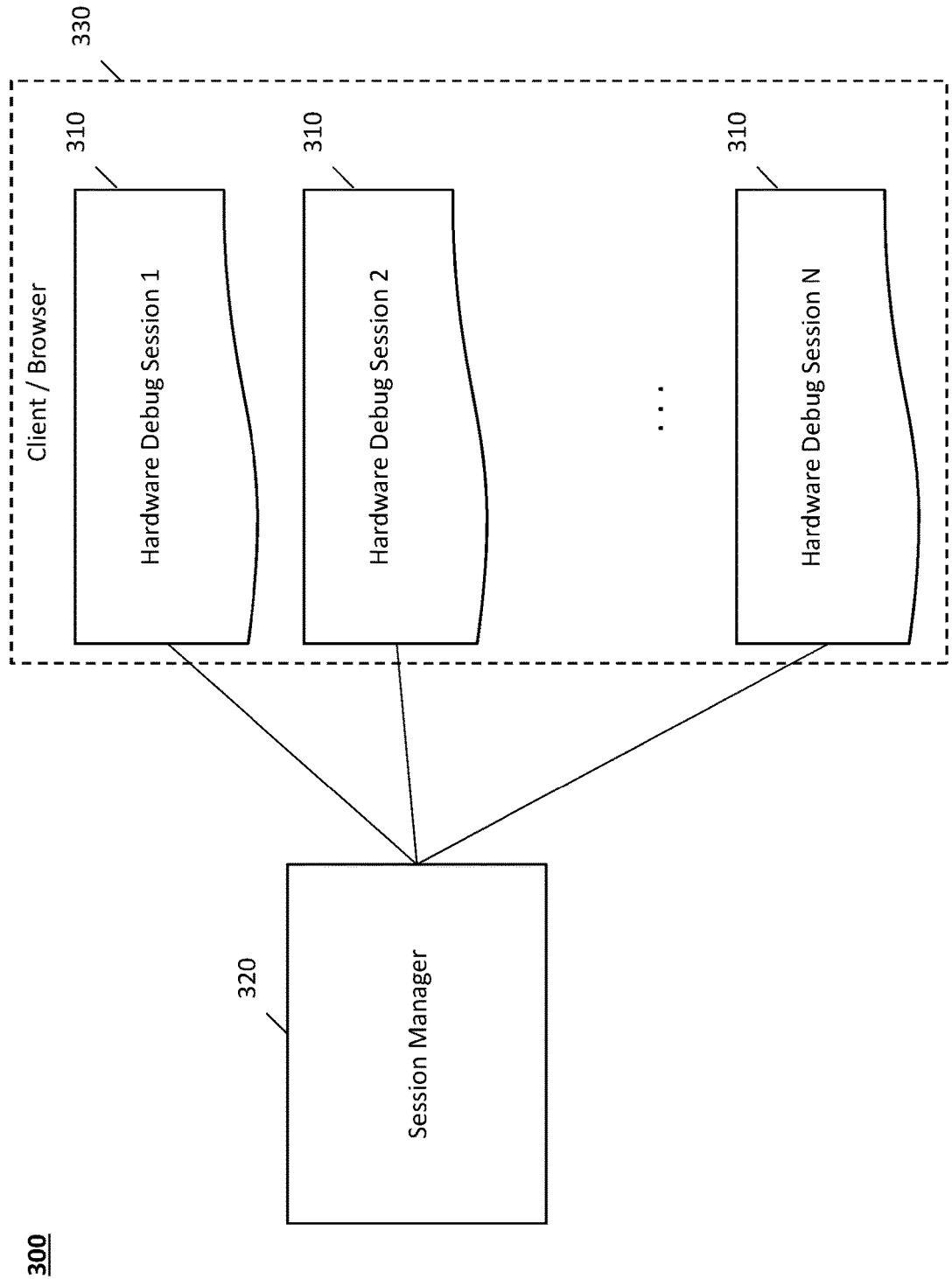
FIG. 3 depicts a block diagram of a logic design system according to one or more embodiments of the present invention.

FIG. 3 depicts a block diagram of a logic design system 300 according to one or more embodiments of the present invention. The logic design system 300 is a foundational electronic design automation (EDA) logic design platform that uses services, such as microservices to implement one or more functions that the logic designers 205 used for generating the logic design 270. The services are scalable. The logic design system 300 facilitates aspect-oriented hardware design and debugging. Aspect-oriented hardware design (AOD) is a paradigm that aims to increase modularity by allowing the separation of cross-cutting concerns when developing a hardware design. AOD facilitates including/using source code that can be useful for the logic designers 205 to complete the logic design and verification, but which is not part of the final logic design 270 (and in turn the chip 280). For example, in addition to main function of the hardware, additional aspects can be clocking, power, test, and trace.

The logic design system 300 includes one or more sessions 310 that are all managed by a session manager 320. The sessions 310 can be part of a client application 330 that is coupled with the session manager 310. The session manager 320 and the client application 330 can be part of a single user interface window, or two separate user interface windows. In one or more embodiments of the present invention, each session 310 has its own user interface window, which is displayed inside the client application 330. In one or more embodiments of the present invention, the client application 330 does not have its own user interface window; rather, each session 310 has its own user interface window.

FIG. 3 depicts a view of a particular logic designer 205, and different logic designers 205 can have a different number of sessions 310 open concurrently. The logic designer 205 can switch between one session 310 to another session 310. In one or more embodiments of the present invention, the switch can be performed via user interactions with the session manager 320, and/or with the sessions 310 themselves.

Figure 4:
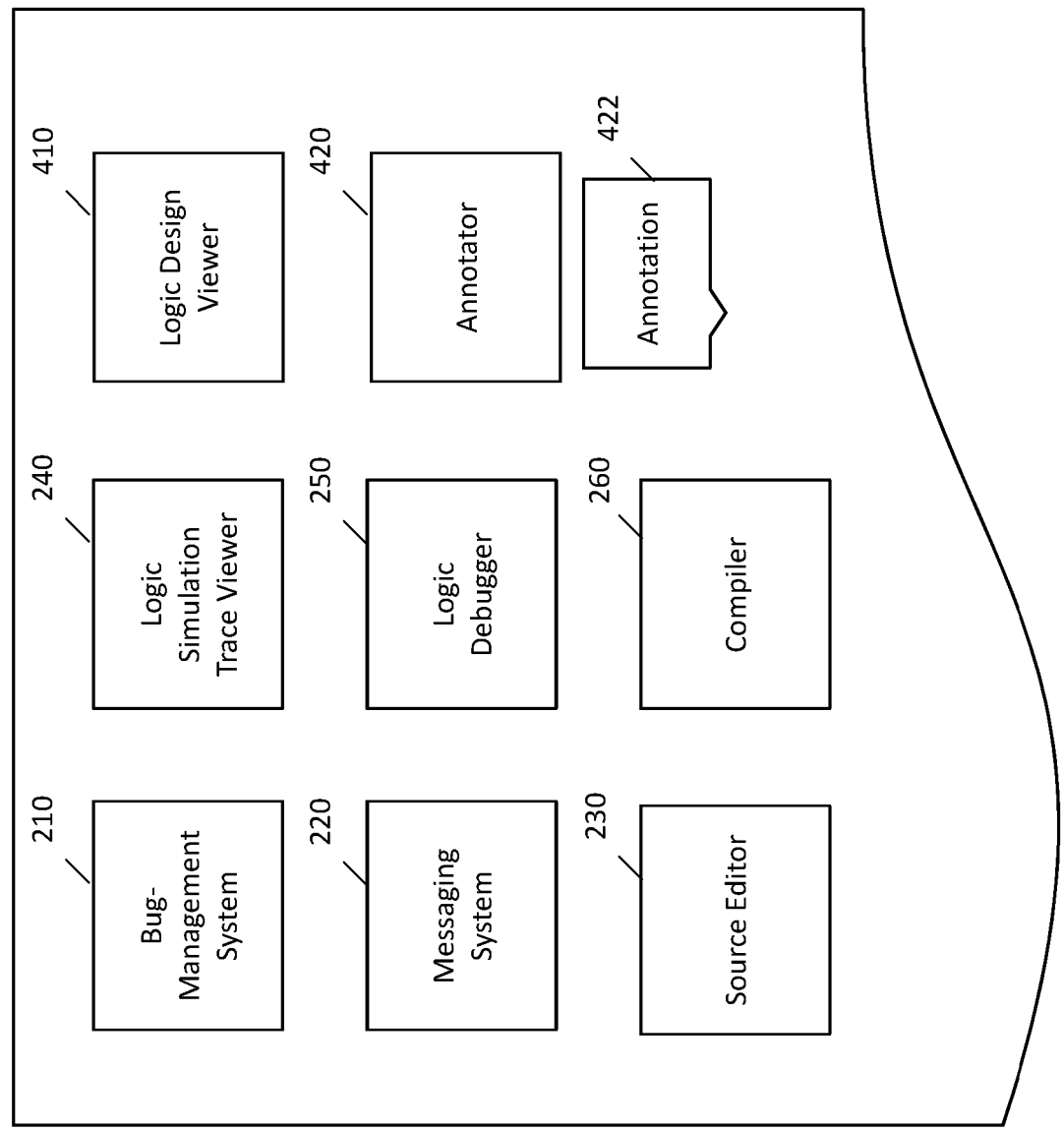
FIG. 4 depicts a block diagram of a session according to one or more embodiments of the present invention.

FIG. 4 depicts a block diagram of a session 310 according to one or more embodiments of the present invention. Each session 310 is a set of applications (i.e., computer programs) that are pre-configured and contained. The applications are microservices, web services, or other types of programs that can be executed within a container. Here, a "container" is a standard unit of software that packages an executable environment for one or more applications. The container includes an entire runtime environment: the application, plus all its dependencies, libraries and other binaries, and configuration files needed to run the application, bundled into one package. Session 310 can be further containerized using one or more containerization techniques such as DOCKER®.

In one or more embodiments of the present invention, session 310 can be executed via a web browser. Alternatively, or in addition, the session 310 can be executed using any other application, including an operating system, such as WINDOWS®, LINUX®, etc.

Session 310 can include one or more of the tools (see FIG. 2) that the logic designer 205 uses for the logic design and verification. The tools are executed as microservices in session 310. This facilitates the logic design system 300 to provide interactions between one or more tools that are being used inside session 310. For example, the selection of one or more elements in one tool, for example, the source editor 230, can trigger the selection of corresponding element(s) in another tool, for example, the logic simulation trace viewer 240. It is understood that the interaction can be between any other tools and that the above is just one example.

In addition, in one or more embodiments of the present invention, session 310 can include a logic design viewer 410. The logic design viewer 410 can show a hierarchical view of one or more source codes, for example, files that are part of the logic design. For example, the source code files can be a collection of VHDL, and/or other programming language files. The logic designer 205 can select and open (in the source editor 230, for example) one or more of the source code files via the logic design viewer 410.

In addition, in one or more embodiments of the present invention, session 310 can include an annotator 420. The annotator 420 facilitates the logic designer 205 to annotate one or more elements of the logic design in the present session 310. For example, the annotator can provide one or more user interface elements that allow the logic designer 205 to type or record a note 422. The note 422 is associated with the present session 310 and is not visible in any other session 310. The note 422 can also be associated with one or more elements from the several elements of the logic design 270 being interacted with in session 310. Here, an element can include one or more instructions from the source code, a portion of a simulation trace, a clock diagram of the operation of the circuit represented by the logic design, or any other such element. An "element" can thus include any selectable user interface element in the session 310.

Changes made to the logic design in one session 310 can be contained with that session 310 itself, until the logic designer 205 synchronizes such changes with a central repository of the logic design 270, in one or more embodiments of the present invention. In one or more embodiments of the present invention, the synchronization may be performed by default unless the logic designer 205 prevents such a synchronization.

Figure 5:
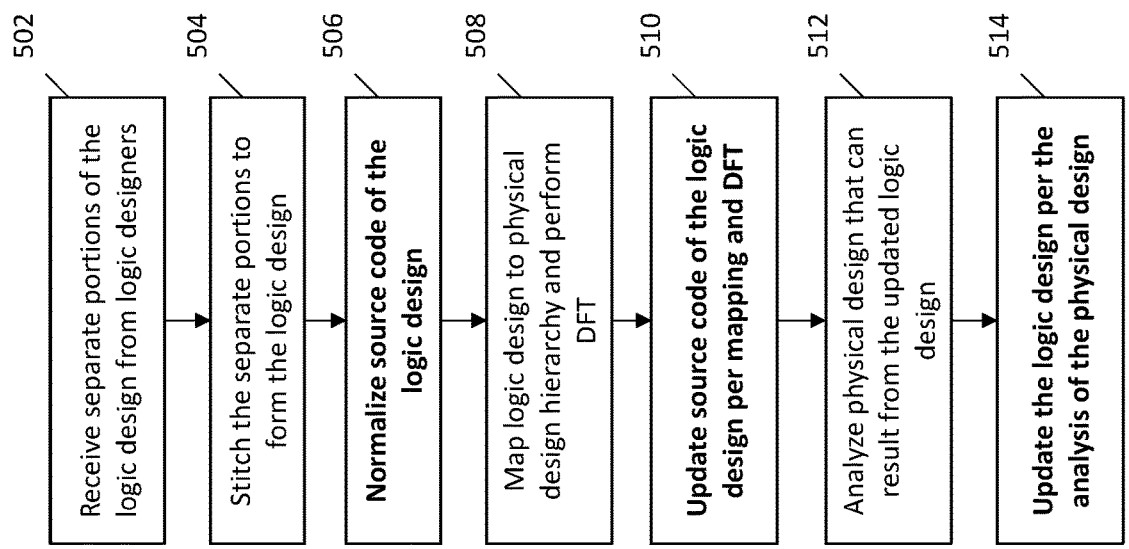
FIG. 5 depicts a flowchart of using a session for logic design and verification according to one or more embodiments of the present invention.

FIG. 5 depicts a flowchart of using a session for logic design and verification according to one or more embodiments of the present invention. It should be noted that different logic designers 205 can be working on different portions of the logic design 270 concurrently, in their individual sessions 310. The different portions are stitched, i.e., combined to achieve the logic design 270.

The logic design and verification 102 includes receiving separate portions of the logic design 270 from the different logic designers 205 who are creating the logic design, at block 502. The portions of the logic design 270 can be received as separate source code (e.g., VHDL, Verilog, etc.) files. The received portions of the logic design 270 are stitched together, at block 504. The stitching can include compiling the source code in a specific sequence to facilitate outputs from a module in the logic design being used by one or more other modules.

In one or more embodiments of the present invention, a normalized source code, such as a normalized VHDL, is created from the received separate portions of the logic design, at block 506. The normalization can include aggregating common source code and/or modules that may be implemented by different logic designers 205 and removing such redundancy. Further, the normalization can include applying a common syntactic context so that variables, parameters, function names, macros, and other such elements from the logic design 270 follow a specific convention.

Further, the logic design 270 can be mapped to a physical design hierarchy, and DFT can be performed at block 508. The source code of the logic design is updated based on one or more defects identified during the mapping and DFT, at block 510. Further yet, the physical design that can result from the updated logic design 270 is analyzed at block 512. One or more defects can be detected based on such analysis. The logic design 270 is further updated to correct such defects, at block 514.

Throughout the logic design and verification 102 performed using one or more embodiments of the present invention, the operations that require an update to the logic design 270 (highlighted in FIG. 5) are performed using the logic design system 300. Such updates can be performed by teams of the logic designer 205 using AOD and debug. The logic design system 300 facilitates the logic designers 205 to save and share states among each other to be able to reproduce, and in turn, debug one or more defects.

FIG. 6 depicts a block diagram of a session manager according to one or more embodiments of the present invention. The session manager 320 can have a separate user interface from the sessions 310. The session manager 320 facilitates the creation of a new session using a user interface element 612, such as a button. Creating a new session 310 includes creating a new containerized logic design session that includes one or more applications used for the logic design and verification 102 along with setting up one or more parameters for the applications.

In addition, the session manager 320 provides an overview of one or more sessions 310 that are available to the logic designer 205. In one or more embodiments of the present invention, all the sessions 310 that are created for the logic design 270 are available to each logic designer 205. Alternatively, or in addition, only the sessions 310 that are created by the logic designer 205 and/or the sessions 310 that are delegated to the logic designer 205 are accessible to the logic designer 205 via the session manager 320.

The session manager 320 displays session name 602, owner status 604, a session-state 606, a modification date 608 of the session, and one or more actions 610 that can be performed on a session. It should be noted that in one or more embodiments of the present invention, additional or less information associated with the session can be displayed. For example, the session manager 320 can include a session identifier, session creation date, and other metadata associated with the sessions 310.

The session name 602 can be editable. The owner status 604 can include identification (e.g., name, employee identifier, etc.) of a user that created a session 310. The owner status 604 can also include identification of one or more delegates that have been provided access to session 310.

The session-state 606 identifies whether session 310 is being used, empty, or any other such status information associated with the session 310. For example, if session 310 is being used, the session-state 606 can indicate "running," or any other such indicator. Other indicators are possible in one or more embodiments of the present invention. The modified date 608 can indicate the date on which the session 310 was changed most recently.

Further, the actions 610 can include one or actions, such as run, delete, delegate, restart, shutdown, edit, etc. that can be performed for session 310. Running the session 310 can initiate the session, which changes the session-status 606 to "running." A session 310 that is already running can be shut down or restart in one or more embodiments of the present invention.

A session 310 can be delegated to one or more logic designers 205 in one or more embodiments of the present invention. Such delegation facilitates the delegated logic designer 205 to be able to access the session 310 to update the logic design 270 and make one or more notes 422 in that session 310.

A session 310 can be deleted, which purges one or more notes 422 and other content of the session 310. In one or more embodiments of the present invention, only the creator of the session 310 can delete the session 310.

It should be noted that session manager 320 can include additional user interface elements that facilitate the logic designers 205 to manipulate session 310 in other ways.

Figure 7:
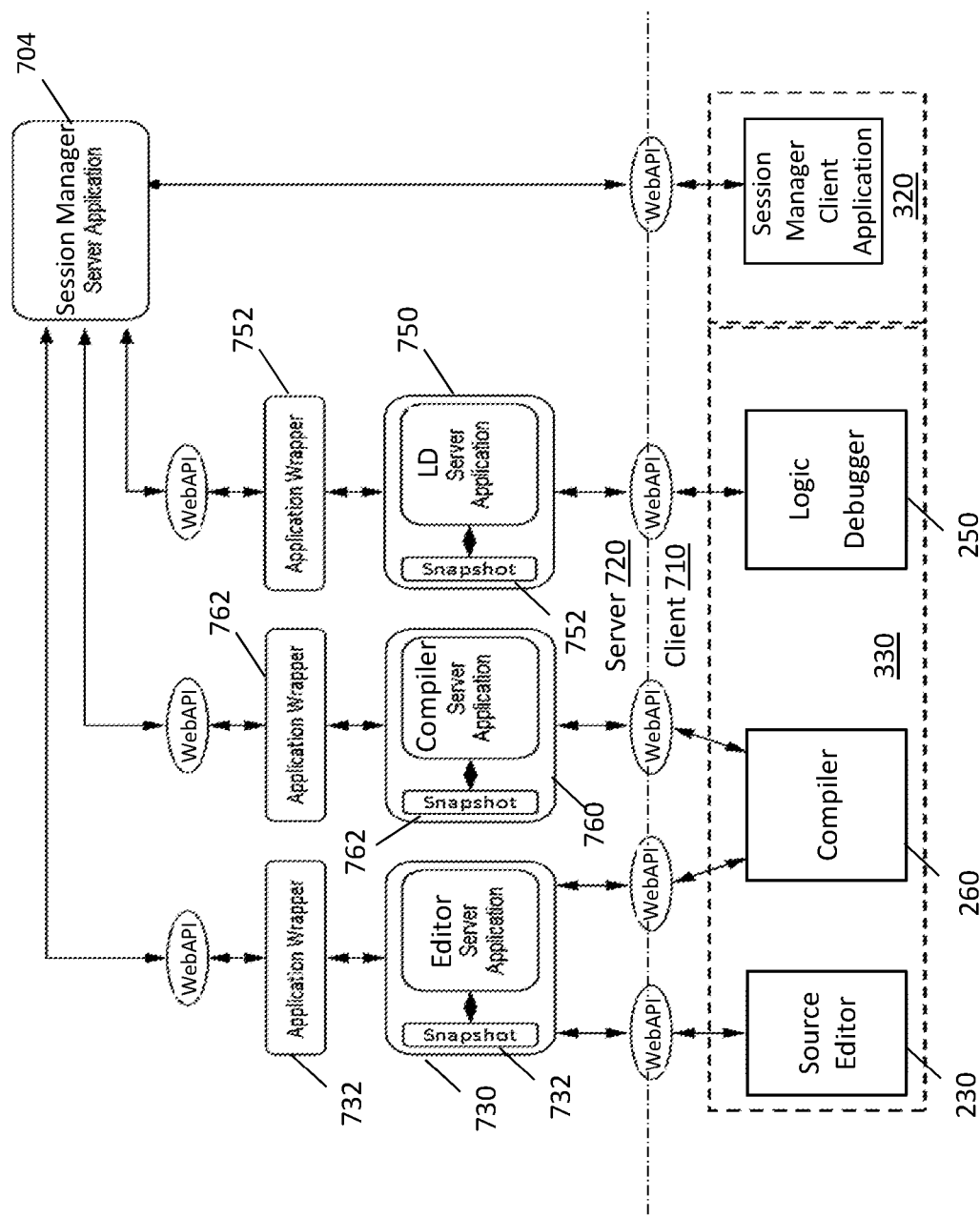
FIG. 7 depicts a workflow and block diagram of an implementation of the logic design system according to one or more embodiments of the present invention.

FIG. 7 depicts a workflow and block diagram of an implementation of the logic design system according to one or more embodiments of the present invention. The logic design system 300 can be implemented using a server-client architecture, where the session manager 320 and the client application 330 together form the "client" 710 that communicates with a backend "server" 720 to facilitate the microservices to operate. It should be noted that the "server" 720 can be implemented using one or more computer servers, for example, in a distributed manner.

The applications and modules on the client 710 communicate with corresponding applications and modules on the server 720 using application programming interface, virtual network communication, and other such protocols. Each application that the logic designer 205 uses in session 310, via the client application 330, has a corresponding server application. For example, the source editor 230, which is used by the logic designer 205 via session 310, has a corresponding editor server application 730 that executes on the server 720. Similarly, the compiler 260 has a corresponding compiler server application 760, and the logic debugger 250 has a logic debugger server application 750, respectively. It should be noted that other applications from the sessions 310 can also have corresponding server applications, which are not depicted in FIG. 7.

Each of the server applications 720, 750, 760 stores a snapshot. For example, the source editor server application 730 stores a snapshot 732, the compiler server application 760 stores a snapshot 762, and the logic debugger server application 750 stores a snapshot 752. Other server applications store their corresponding snapshots. Each of the snapshots 732, 752, 762 stores a persistent state of the corresponding server application. The snapshot can be stored in an offline area of memory of the server 720 to facilitate access to the snapshot after the logic debug session has been shut down. The snapshot stores the one or more parameters of the corresponding server application to facilitate state retention. In one or more embodiments of the present invention, a collection of the snapshots 732, 752, 762 of the server applications 730, 750, 760 is considered as the "state" of the logic debug session. The snapshots can be aggregated in a single set of files, or data, that can be shared among one or more logic designers 205 to facilitate collaborative aspect-oriented design and debugging. Each snapshot can be used by the corresponding server application to initiate itself at the stored state from the snapshot.

A first application in session 310, for example, the compiler 260, may communicate with a server application corresponding to a second application, for example, the editor server application 730. Such communication facilitates providing features, such as, semantic analysis of source code by the compiler. It should be noted that other applications and server applications, apart from those discussed in the example above, can also communicate with each other in other embodiments of the present invention.

The session manager 320 also has a counterpart session manager server application 704. The session manager server application 704 communicates with each of the server applications 730, 750, 760 via application program interfaces. In one or more embodiments of the present invention, each of the server applications 730, 750, 760 have corresponding application wrappers 732, 752, 762, which handle the application interface-based communication with the session manager server application 704.

Figure 8:
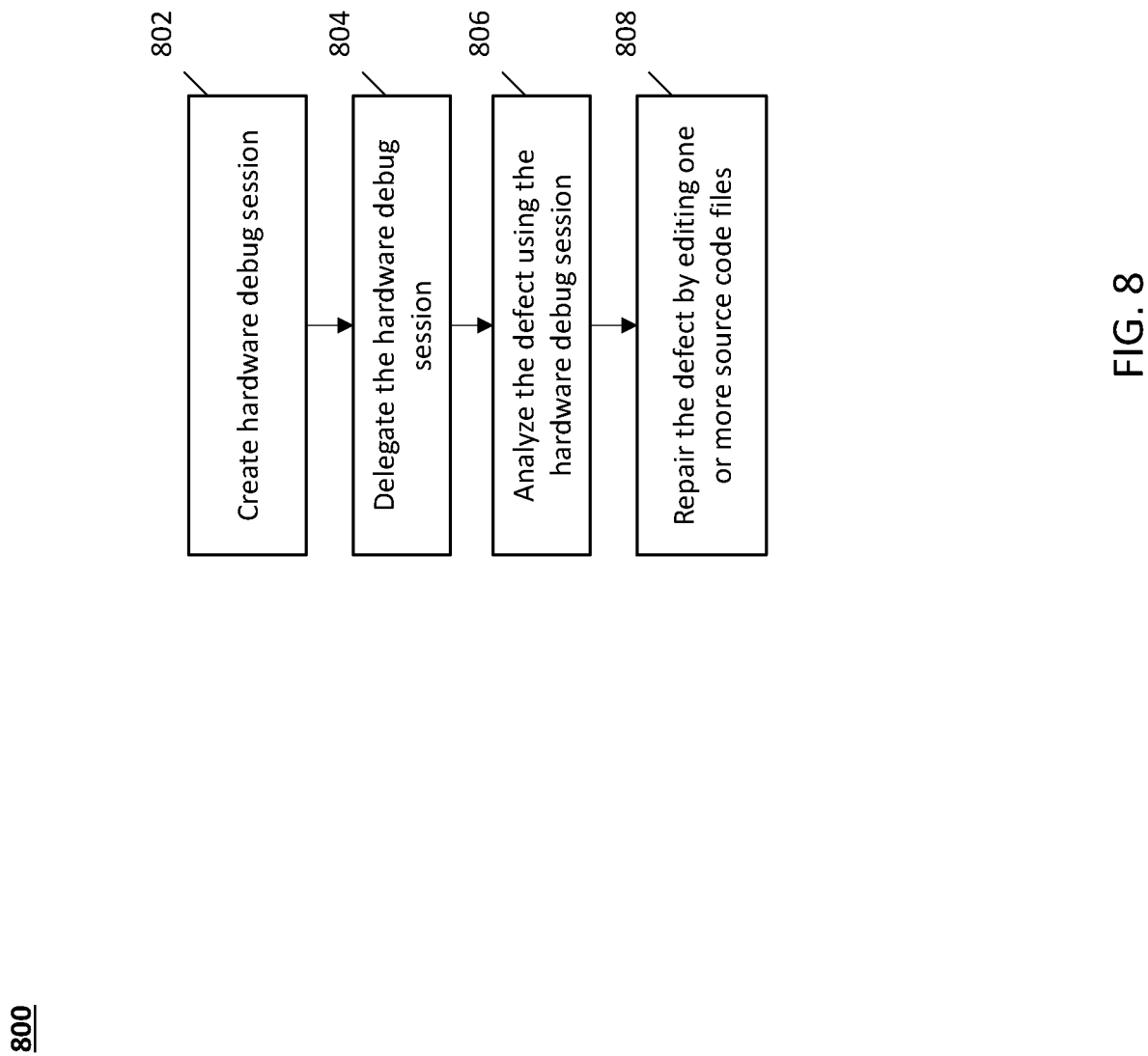
FIG. 8 depicts a method for collaborative logic designing and debugging of a circuit according to one or more embodiments of the present invention.

FIG. 8 depicts a method 800 for collaborative logic designing and debugging of a circuit according to one or more embodiments of the present invention. The method 800 includes creating, via the session manager 320, a hardware debug session 310 that includes the instances of client applications that can access one or more files associated with the logic design 270 of the circuit 280, at block 802. The instances of client applications are configured to replicate an execution state of the logic design 270.

The execution state can be defined using one or more parameters of each module and/or element in the logic design 270. For example, the modules in the logic design 270 can include a power module, an arithmetic module, an input/output module, a communication module, and various other modules. In one or more embodiments of the present invention, the parameters can include a state of one or more gates, flip-flops, transistors, or any other element of the logic design 270. The execution parameters can include a clock state, a simulation trace, and other information of the execution state. The parameters can also include physical attributes such as temperature, voltage, current, or other such attributes that can contribute to the operation and/or failure (i.e., defect) of the logic design 270. In addition, the execution state can include one or more annotations about the state of the logic design 270 that can help a logic designer 205 to identify and analyze a defect associated with the execution state. The execution state (also referred to as "state") can be saved/stored as the set of parameters and their values in a file, such as a text file, a binary file, etc.

Initiating the hardware debug session 310 can include opening stored hardware debug session 310 that is accessible via the session manager 320. The configuration for the execution state is used when opening the one or more applications in the session 310. Accordingly, one or more applications are set up in a state where the logic designer 205 can identify and analyze the defect that is to be addressed in the logic design 270.

In one or more embodiments of the present invention, creating the session 310 can include executing one or more instructions of the logic design 270 until the defect occurs, and saving the present values of the one or more parameters associated with the logic design 270. The one or more instructions can be executed using a simulator and/or an emulator of the logic design 270. The parameter values for storing the execution state can include a predetermined set of parameter values. Alternatively, or in addition, the logic designer 205, who is executing the logic design 270, is provided a user interface to select the parameter values to be stored as part of the execution state.

The session 310 that is created is stored, for example, as a file, and an accessible link for that session 310 is created in the session manager 320 at the client device of the logic designer 205 that created the session 310.

In one or more embodiments of the present invention, the creator can delegate the session 310 to one or more logic designers 205, at block 804. The delegation can include selecting one or more logic designers 205. The delegated logic designers 205 can access the session 310 and execute the session 310 at their respective client devices to address the defect in the logic design 270. In one or more embodiments of the present invention, the delegated session 310 is accessible via the session manager 320 at the respective logic designers 205 who have been delegated the session 310.

The logic designers 205 that have access to the session 310 can analyze the defect in the logic design using session 310, at block 806. Analyzing the defect includes executing one or more applications using the execution state. The applications can be started at, or slightly before when the defect occurs in the execution of the logic design 270. The logic designer 205 can also access one or more annotations that can assist with identifying the defect in the logic design 270. By considering the execution state, for example, the simulation trace, the source code, clock state, and other such parameters, the logic designer can diagnose the defect.

Further, upon diagnosis, the logic designer 205 can edit the source code of the logic design 270 to repair the defect, at block 808. The execution state can include the editor 230 opening one or more source code files. In addition, the logic designer 205 can open other source code files using the viewer 410. The logic designer 205 can indicate the changes s/he made using the bug management system 210 and/or the annotator 420. It should be understood that the logic designers 205 can access other applications in session 310, apart from those mentioned above.

Each of the applications in the session 310 can interact with each other using the respective application program interfaces that are provided, and the applications being executed in the form of services.

Embodiments of the present invention accordingly facilitate a collaborative logic designing and debugging for a team of logic designers. The improvement over present monolithic systems is facilitated by implementing the logic design system using a client-server platform and providing a heterogeneous system of logic design microservices. In addition, embodiments of the present invention facilitate hardware logic design and debug session containment, persistence, and state retention. Embodiments of the present invention also facilitate bringing in a heterogeneous set of data sources from an aspect-oriented hardware design flow context, translating that to microservices in the system, and enabling inter-operation across the services for cross aspect logic debug in aspect-oriented hardware designs. Embodiments of the present invention also facilitate translating graphical design automation tools into scalable logic design microservices, and their interoperation with other logic design microservices in the heterogeneous system for application coupling within a logic debug context. Embodiments of the present invention accordingly provide a cloud native microservices based collaborative hardware design automation platform.

Figure 9:
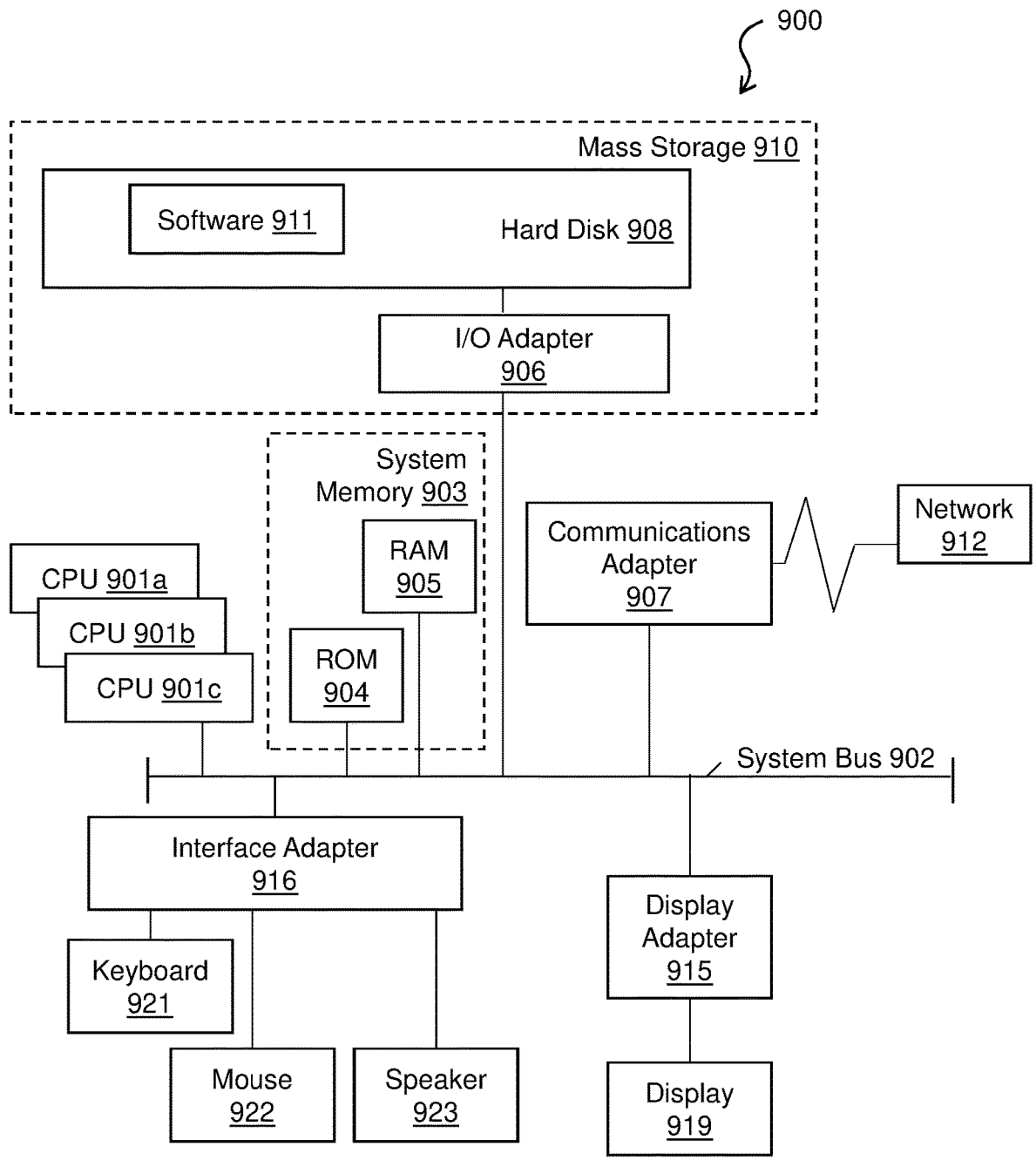
FIG. 9 is a block diagram of an example computing system.

Turning now to FIG. 9, a computer system 900 is generally shown in accordance with an embodiment. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node. Computer system 900 may be described in the general context of computer system executable instructions, such as program modules, being executed by a computer system. Generally, program modules may include routines, programs, objects, components, logic, data structures, and so on that perform particular tasks or implement particular data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 901). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a small computer system interface (SCSI) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein below with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS or AIX operating system from IBM Corporation, to coordinate the functions of the various components shown in FIG. 9.

Additional input/output devices are shown as connected to the system bus 902 via a display adapter 915 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 900 includes processing capability in the form of the processors 901, and, storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
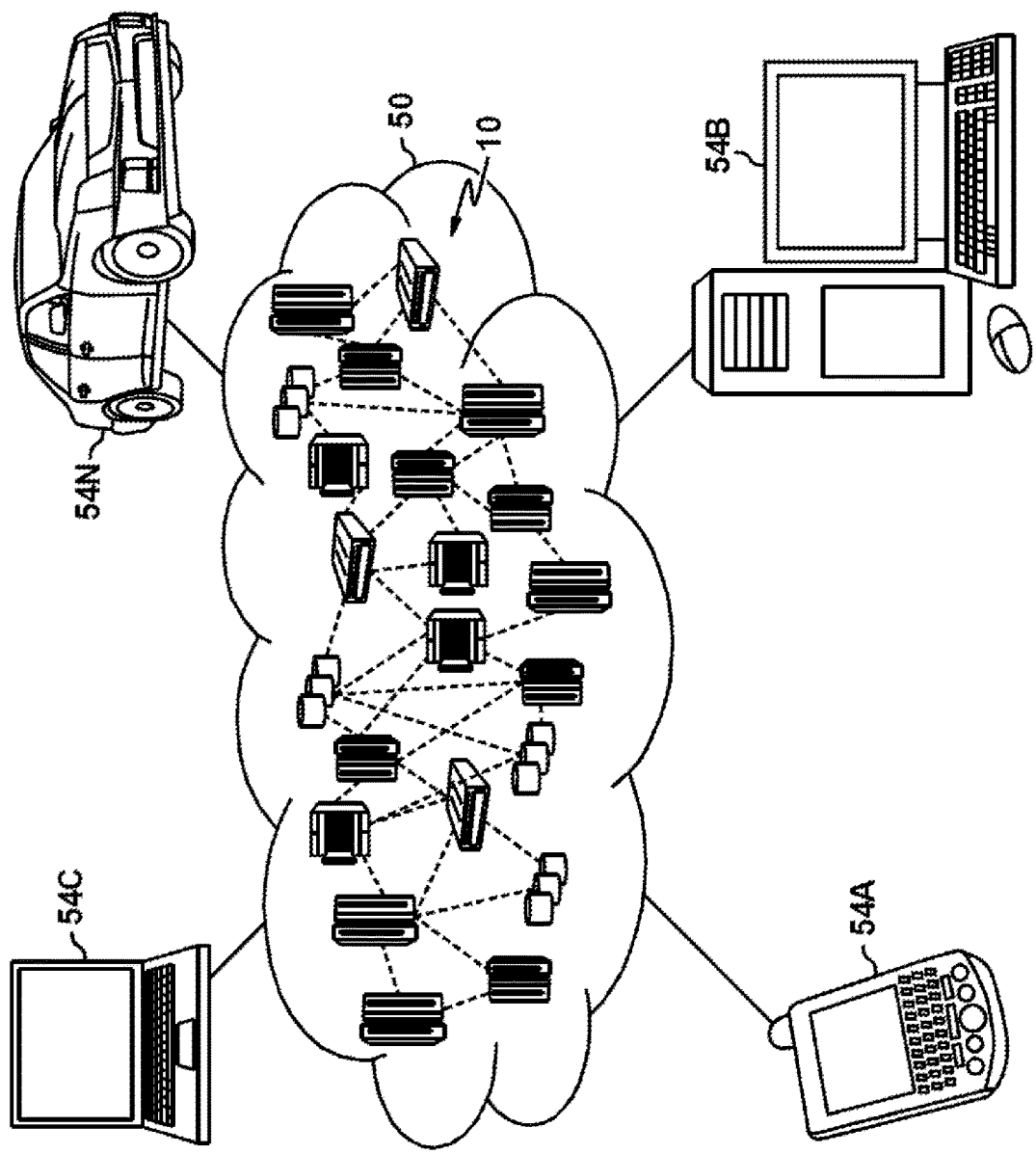
FIG. 10 depicts a cloud computing environment according to one or more embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
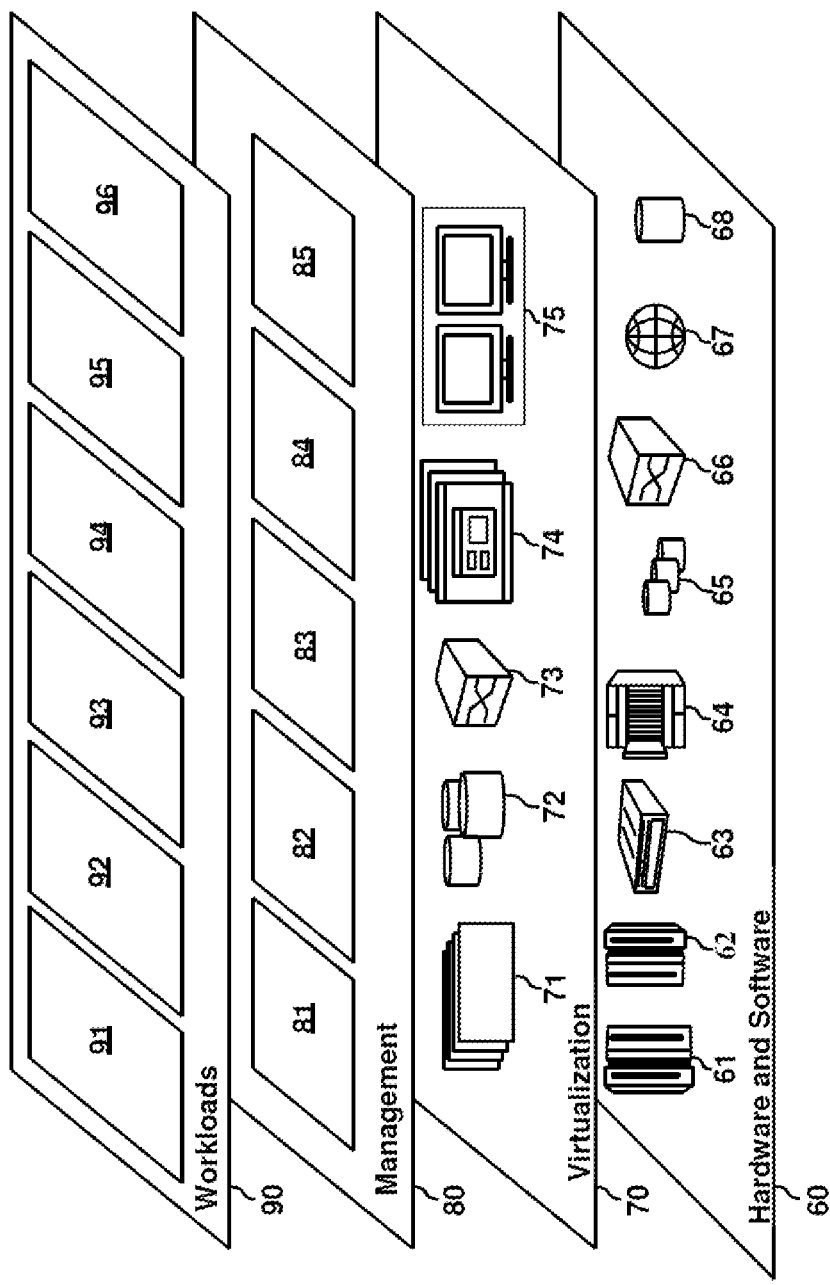
FIG. 11 depicts abstraction model layers according to one or more embodiments of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and collaborative product development.

Figure 12:
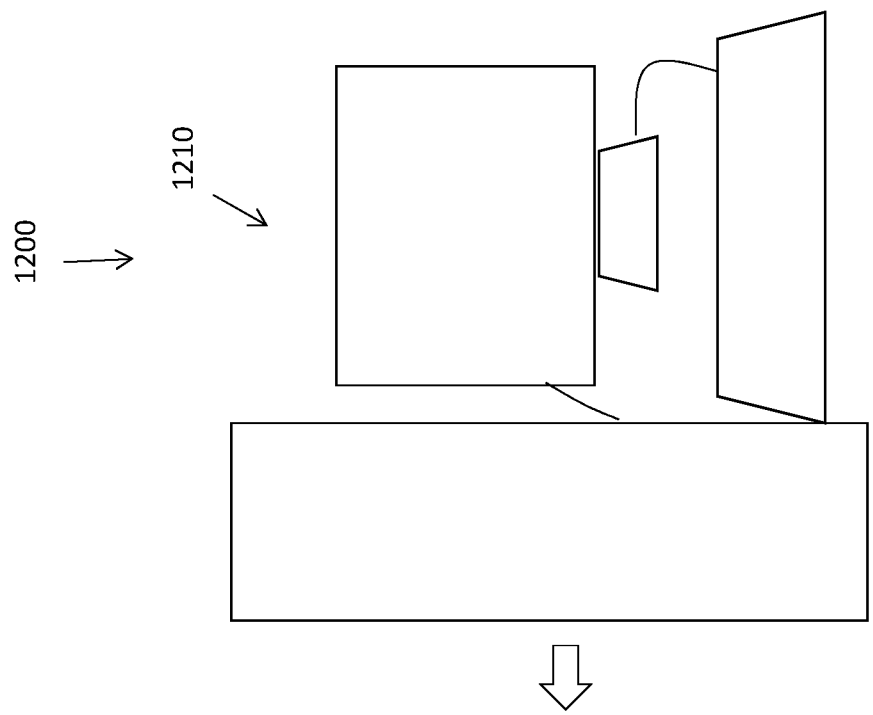
FIG. 12 is a block diagram of a system to perform collaborative product development according to embodiments of the invention.
Figure 12:
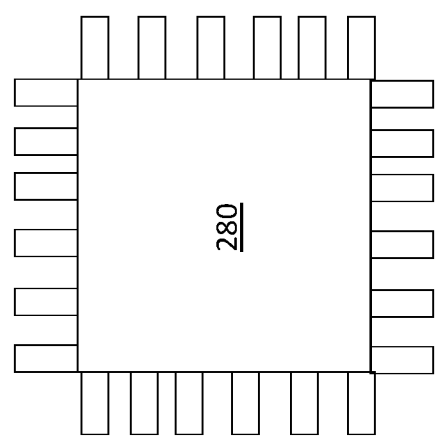

FIG. 12 is a block diagram of a system 1200 to perform collaborative product development according to embodiments of the invention. The system 1200 includes processing circuitry 1210 used to generate the design that is ultimately fabricated into an integrated circuit 280. The steps involved in the fabrication of the integrated circuit 280 are well-known and briefly described herein. Once the physical layout is finalized, based, in part, on collaborative product development according to embodiments of the invention to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 13.

Figure 13:
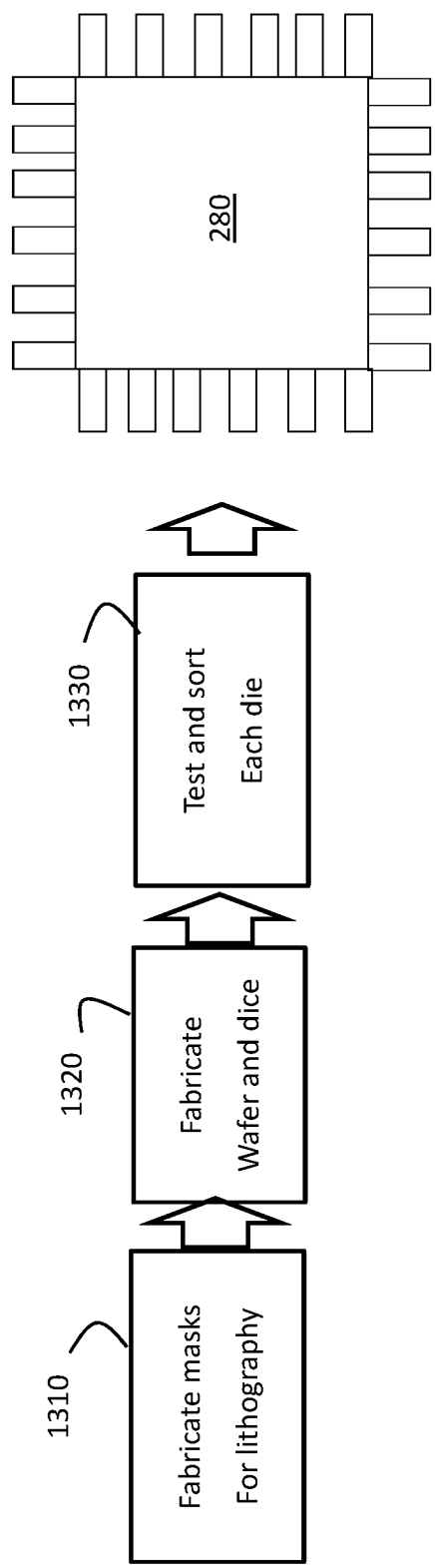
FIG. 13 is a process flow of a method of fabricating the integrated circuit according to exemplary embodiments of the invention.

FIG. 13 is a process flow of a method of fabricating the integrated circuit according to exemplary embodiments of the invention. Once the physical design data is obtained, based, in part, on the collaborative product development, the integrated circuit 280 can be fabricated according to known processes that are generally described with reference to FIG. 13. Generally, a wafer with multiple copies of the final design is fabricated and cut (i.e., diced) such that each die is one copy of the integrated circuit 280. At block 1310, the processes include fabricating masks for lithography based on the finalized physical layout. At block 1320, fabricating the wafer includes using the masks to perform photolithography and etching. Once the wafer is diced, testing and sorting each die is performed, at block 1330, to filter out any faulty die.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source-code or object code written in any combination of one or more programming languages, including an object-oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

What is claimed is:

1. A method for collaborative logic designing and debugging of a circuit, the method comprising:

initiating, by a first user, via a first session manager, a hardware debug session that includes a plurality of instances of client applications that can access one or more source-codes associated with a logic design of the circuit, the plurality of instances of client applications configured to replicate an execution state of the logic design;

executing, by the first user, via the first session manager, the one or more source-codes until detecting a defect in the logic design based on the execution state of the logic design;

delegating, by the first user via the first session manager, the hardware debug session to a second user, the delegating comprising saving the execution state of the logic design that causes the defect, the execution state comprising a hardware state of the circuit represented by the logic design, wherein the hardware state comprises a clock state, a simulation trace, an operating temperature, an operating voltage, an operating current, and a state of one or more gates, flip-flops, or transistors of the circuit;

initiating, by the second user, via a second session manager, the hardware debug session in the execution state that causes the defect; and editing, by the second user, via the second session manager, using the plurality of instances of client applications, the one or more source-codes, to repair the defect in the logic design.

2. The method of claim 1, wherein the hardware debug session includes a containerized runtime environment for executing the plurality of instances of client applications.

3. The method of claim 1, wherein each of the plurality of instances of client applications executes a service that provides an application interface.

4. The method of claim 3, wherein a session manager includes a session manager server application, and each of the plurality of instances of client applications has corresponding instances of server applications.

5. The method of claim 1, wherein the plurality of instances of client applications includes at least one of a source editor, a debugger, a compiler, and a simulation trace viewer.

6. The method of claim 1, wherein delegating the hardware debug session further comprises storing, in the hardware debug session, one or more annotations made by the first user via the first session manager, wherein the second user has access to the one or more annotations via the second session manager in response to initiating the hardware debug session via the second session manager.

7. A system comprising:

a memory device; and one or more processors coupled with the memory device, the one or more processors being configured to perform a method for collaborative logic designing and debugging of a circuit, the method comprising:

initiating, by a first user, via a first session manager, a hardware debug session that includes a plurality of instances of client applications that can access one or more source-codes associated with a logic design of the circuit, the plurality of instances of client applications configured to replicate an execution state of the logic design;

executing, by the first user, via the first session manager, the one or more source-codes until detecting a defect in the logic design based on the execution state of the logic design;

delegating, by the first user via the first session manager, the hardware debug session to a second user, the delegating comprising saving the execution state of the logic design that causes the defect, the execution state comprising a hardware state of the circuit represented by the logic design, wherein the hardware state comprises a clock state, a simulation trace, an operating temperature, an operating voltage, an operating current, and a state of one or more gates, flip-flops, or transistors of the circuit;

initiating, by the second user, via a second session manager, the hardware debug session in the execution state that causes the defect; and editing, by the second user, via the second session manager, using the plurality of instances of client applications, the one or more source-codes, to repair the defect in the logic design.

8. The system of claim 7, wherein the hardware debug session includes a containerized runtime environment for executing the plurality of instances of client applications.

9. The system of claim 7, wherein each of the plurality of instances of client applications executes a service that provides an application interface.

10. The system of claim 9, wherein a session manager includes a session manager server application, and each of the plurality of instances of client applications has corresponding instances of server applications.

11. The system of claim 7, wherein the plurality of instances of client applications includes at least one of a source editor, a debugger, a compiler, and a simulation trace viewer.

12. The system of claim 7, wherein the hardware debug session is a first session that is configured to replicate a first execution state of the logic design, and the first session manager initiates a second hardware debug session that is configured to replicate a second execution state of the logic design.

13. The system of claim 7, wherein delegating the hardware debug session further comprises storing, in the hardware debug session, one or more annotations made by the first user via the first session manager, wherein the second user has access to the one or more annotations via the second session manager in response to initiating the hardware debug session via the second session manager.

14. A computer program product comprising a memory storage device having computer executable instructions stored thereon, the computer executable instructions when executed by one or more processing units cause the one or more processing units to perform a method for collaborative logic designing and debugging of a circuit, the method comprising:

initiating, by a first user, via a first session manager, a hardware debug session that includes a plurality of instances of client applications that can access one or more source-codes associated with a logic design of the circuit, the plurality of instances of client applications configured to replicate an execution state of the logic design;

executing, by the first user, via the first session manager, the one or more source-codes until detecting a defect in the logic design based on the execution state of the logic design;

delegating, by the first user via the first session manager, the hardware debug session to a second user, the delegating comprising saving the execution state of the logic design that causes the defect, the execution state comprising a hardware state of the circuit represented by the logic design, wherein the hardware state comprises a clock state, a simulation trace, an operating temperature, an operating voltage, an operating current, and a state of one or more gates, flip-flops, or transistors of the circuit;

initiating, by the second user, via a second session manager, the hardware debug session in the execution state that causes the defect; and editing, by the second user, via the second session manager, using the plurality of instances of client applications, the one or more source-codes, to repair the defect in the logic design.

15. The computer program product of claim 14, wherein the hardware debug session includes a containerized runtime environment for executing the plurality of instances of client applications.

16. The computer program product of claim 14, wherein each of the plurality of instances of client applications executes a service that provides an application interface.

17. The computer program product of claim 14, wherein the plurality of instances of client applications includes at least one of a source editor, a debugger, a compiler, and a simulation trace viewer.

18. The computer program product of claim 14, wherein the hardware debug session is a first session that is configured to replicate a first execution state of the logic design, and the first session manager initiates a second hardware debug session that is configured to replicate a second execution state of the logic design.

19. The computer program product of claim 14, wherein delegating the hardware debug session further comprises storing, in the hardware debug session, one or more annotations made by the first user via the first session manager, wherein the second user has access to the one or more annotations via the second session manager in response to initiating the hardware debug session via the second session manager.

* * * * *